United States Patent Office 2,759,170
Patented Aug. 14, 1956

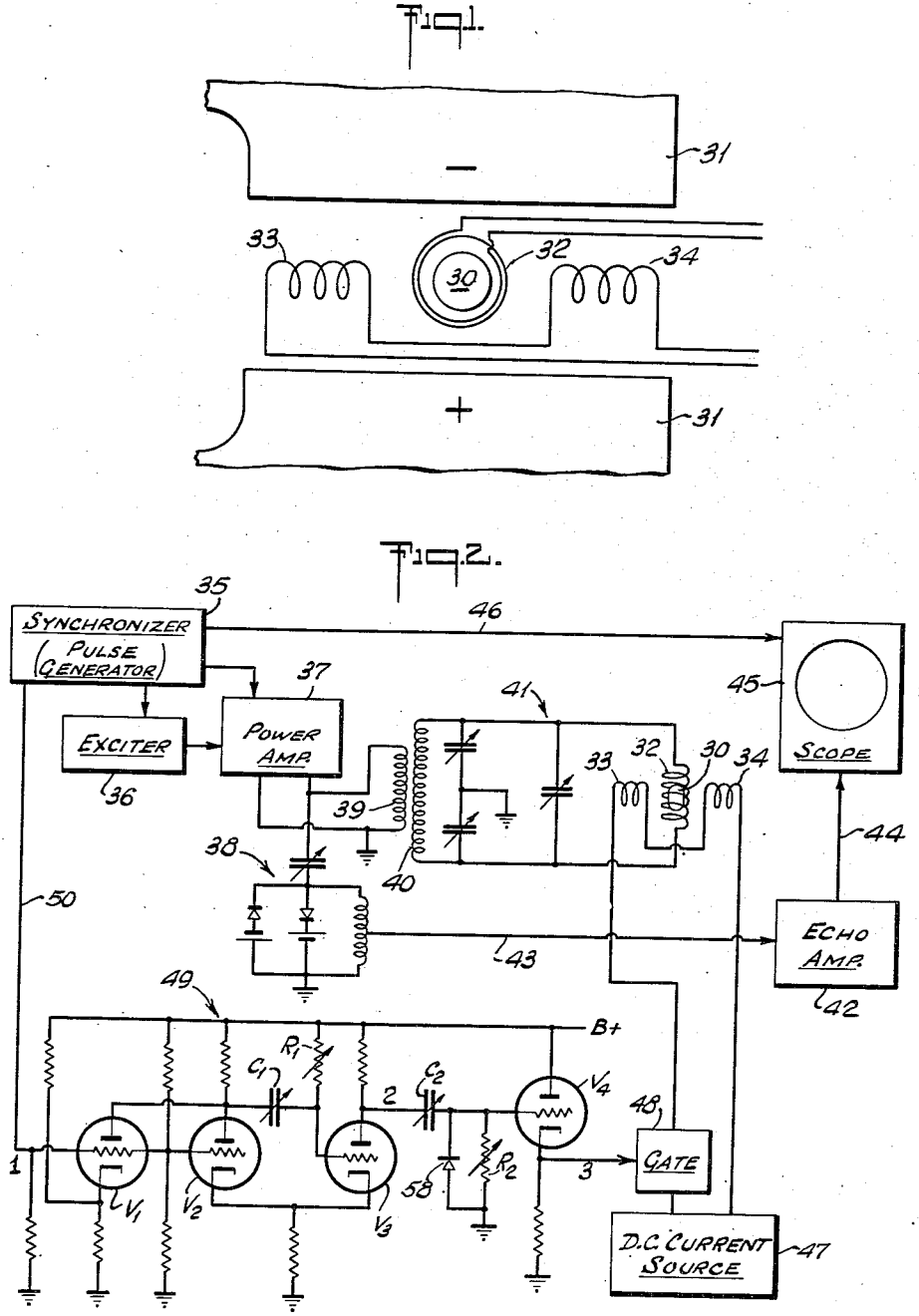

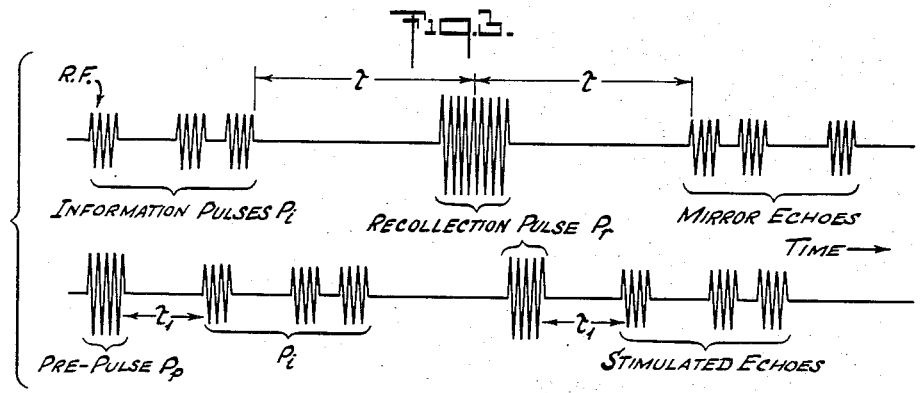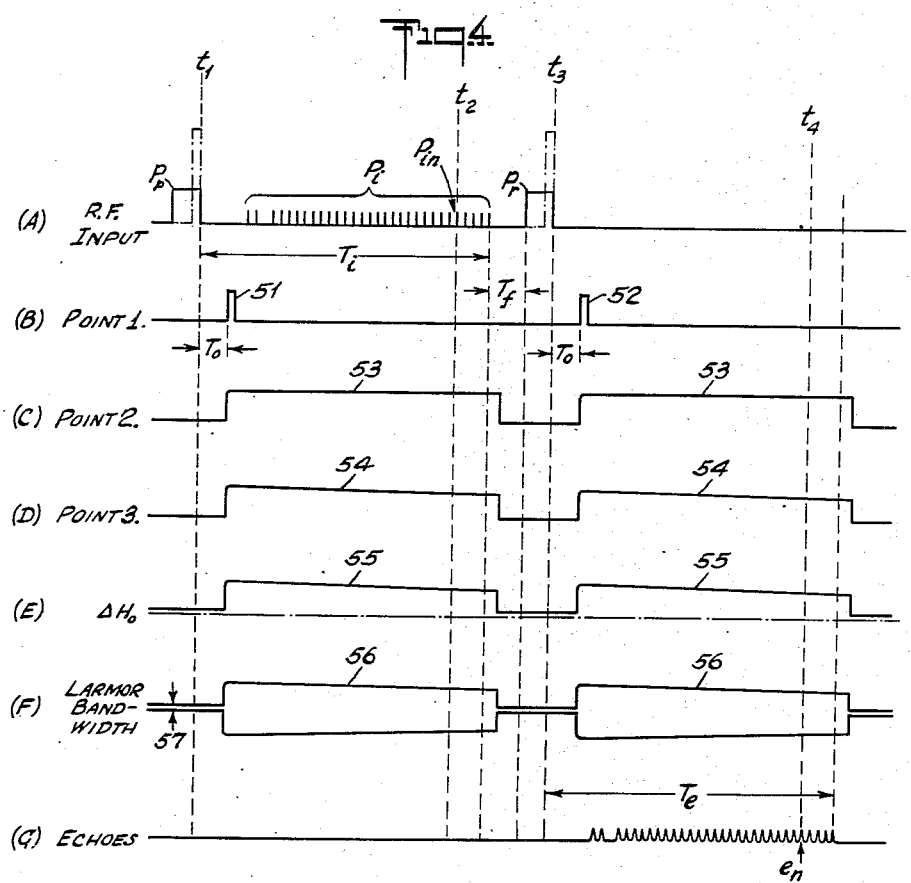

2,759,170

STIMULATED SPIN ECHO SYSTEMS

Arthur G. Anderson, Riverdale, and John W. Horton, New York, N. Y., assignors to International Business Machines Corporation, a corporation of New York Application November 10, 1954, Serial No. 467,997

9 Claims. (Cl. 340—173)

The present invention pertains to improvements in stimulated spin-echo systems, being a continuation-in-part of copending application Serial No. 448,592, filed August 9, 1954.

An object of the invention is to provide an improved method of employing wide field variation in a stimulated echo system for reducing the input power requirements while concurrently discriminating against unwanted echoes.

A further object is to provide a method of the above nature in which the principal wave amplitude of field change is adapted to provide major Larmor frequency band-width control while the wave contour and field characteristics inhibit formation of unwanted or spurious echoes.

A further object is to provide a method of the above nature adapted to provide for maximum utilization of the storage and echo time periods while maintaining effective uniformity of echo formation.

Another object is to provide suitable apparatus for carrying out the improved method to the best advantage.

Other related objects and advantages will become evident during the course of the following description in connection with the accompanying drawings, in which Figures 1 and 2 are diagrams jointly illustrative of spin-echo apparatus suitable for carrying out the present method;

Figure 3 comprises two parallel time diagrams illustrating the difference between mirror and stimulated type spin-echo techniques, and Figure 4 is a set of related time diagrams showing the combined effects of spurious echo elimination and "Tucker effect" or major Larmor frequency band-width control as applied to stimulated echo production by the present invention.

Spin-echo technique, based generally on the behavior of spinning gyroscopic particles in aligning or polarizing fields, may best be illustrated as applied to atomic nuclei affected by a strong magnetic field and producing the desired echo effects due to free nuclear induction. The phenomenon of free nuclear induction per se has been set forth in U. S. Patent No. 2,561,489 to F. Bloch et al., as well as in various well-known scientific publications by Bloch and by Purcell. The extension of the effect to produce spin-echoes, the work of E. L. Hahn, was described by the latter scientist in an article entitled "Spin Echoes," published in Physical Review, Nov. 15, 1950. As the above publications are readily available in the public domain, repetition herein of the entire complex mathematical analysis contained in them is obviously unnecessary. However, in order to set forth most clearly the nature and advantages of the present invention, it is appropriate first to describe briefly the pertinent general principles of spin-echo technique.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin about its own axis of symmetry, and as the nucleus has mass, it possesses angular momentum of spin and accordingly comprises a gyroscope, infinitely small, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all the nuclei concerned.

So long as the sample remains undisturbed in the field, the gyroscopic nuclei remain in parallel alignment therewith as noted. If, however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0 = \gamma H_0$, where $H_0$ is the field strength affecting each nucleus and $\gamma$ is the previously noted gyromagnetic ratio. This precessional frequency $W_0$ is termed the Larmor frequency, and since for any given type of nuclei $\gamma$ is a constant (for example $2.68 \times 10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies.

It is upon the above described characteristic of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electromagnetic equivalent. The main magnetic field $H_0$ exists in the vertical direction, while a radio-frequency coil 32 is arranged to supply a field with its axis into or out of the paper of the diagram, the R. F. field thus being perpendicular to the $H_0$ field. A pair of direct current coils 33 and 34, arranged as shown diagrammatically with respect to the magnet 31 and R. F. coil 32, are provided to introduce additional field inhomogeneities as hereinafter set forth.

Figure 2 illustrates by semi-block diagram a typical electrical arrangement by which the impulses may be stored and echoes recovered from the sample 30. Inasmuch as the internal structures and modes of operation of the labelled block components are in general well known in the electronic art, description thereof will appropriately be limited to that necessary to explain the manner in which or with what modification they play their parts in carrying out the present invention.

A synchronizer or pulse generator 35 originates prepulses, recollection pulses, and entry or storage pulses required by the system. An exciter unit 36, controllable by the pulse source 35 and comprising an oscillator and a plurality of frequency doubling stages, serves as a driving unit for the R. F. power amplifier 37. In the production of a pulse the source 35 first energizes the exciter 36 to place an R. F. driving signal on the amplifier 37, then "keys" the amplifier to produce an output signal therefrom. This output is routed via a tuning network 38 to a coil 39 which is inductively coupled to a second coil 40 adapted to supply energy to a circuit network 41, the latter including the previously described R. F. coil 32, Fig. 1, containing the sample 30. A signal amplifier 42 has its input conductor 43 connected into the tuning network 38, so that any echo signal induced in the R. F. coil 32 and transmitted back via the coils 40 and 39 is impressed on this amplifier. The output 44 of the amplifier 42 is directed to suitable apparatus for utilization of the echo pulses, such apparatus being illustrated herein by an oscilloscope 45 provided with a horizontal sweep control connection 46 with the synchronizer 35. A D. C. current source 47 is adapted to supply current to the coils 33 and 34 for purposes to be hereinafter explained at length.

In initiating spin-echo effects, the sample 30 is first subjected to the polarizing magnetic field $H_0$ for sufficient time to allow its gyromagnetic nuclei to become aligned as previously described. Taking the simplest case of a single echo production, the sample is then subjected to a pulse of an alternating magnetic field $H_1$ produced by R. F. alternating currents in the coil 32 and hence normal to the direction of the main field $H_0$. This R. F. magnetic field pulse exerts a torque on the spinning nuclei which tips them out of alignment with $H_0$, so that as the pulse terminates the nuclei begin to precess about the main field direction, conveniently termed the Z-axis, with their characteristic Larmor frequencies. Their magnetic moments or components thereof thus rotate in plane normal to the Z-axis, which plane accordingly may be termed the XY plane. Taking for example the behavior of a related group of spinning nuclei as characteristic of all such particles in the sample, it will be evident that the inhomogeneity of the field $H_0$ in different parts of the sample gives rise to the previously explained differential Larmor precession, so that while the group as a whole continues to rotate at a mean rate $\bar{\omega}_0$, the constituent moments of the group fan out or separate from each other at rates dependent on their particular differences in Larmor frequency. So long as this spreading condition persists, the diffusion of the constituent moments of the group prevents their cooperation to generate a signal.

To initiate echo formation, the sample is subjected to a powerful R. F. pulse, termed the "recollection" pulse, which in effect changes the divergence of the constituent moments to convergence. With maintenance of proper time and field condition relationship, as further noted hereinafter, the rotating moments eventually return to coincidence, at which point they reinforce each other to induce a signal in the R. F. coil 32, this signal being the "echo" of the "entry" R. F. pulse which initiated the sequence. The signal is transmitted to the amplifier 42, amplified, and directed to the oscilloscope 45 or other device for utilization.

The above description, as noted, set forth for illustration the simple case of a single echo, in which case the maximum echo signal would normally be produced by applying an "entry" pulse sufficient to tip the moment group through 90°, i. e., completely into the XY plane. Lesser angles of tip also produce useful moment groupings, so that by applying successive entry pulses of proper duration and amplitude, a plurality of entries may similarly be made to produce a corresponding train of echoes. However, in this and all other variations of the process as hereinafter set forth, it will be understood that the basis of echo production is the same, namely the systematic disassembly and subsequent systematic reassembly of related moments of spinning particles in a suitable field.

In practice, there are two important types of procedure in spin-echo formation, namely the "mirror echo" process and the "stimulated echo" process, illustrated in comparison in Figure 3. In this figure the ordinate represents the voltage across the terminals of the R. F. coil 32 containing the sample, while the abscissa represents time. In order to make illustration feasible, the echo pulses have been drawn $10^5$ times larger than they would be on a scale of the ordinate suitable for drawing the storage and recollection pulses. The duration of each storage pulse may be of the order of a few microseconds, whereas the times $\tau$, which are the "memory" or "storage" intervals, may be for example of the order of seconds when water is used as a storage medium comprising the sample 30.

The difference in storage methods for "mirror" and "stimulated" echo production, which is a fundamental distinction, has been set forth in detail in the previously mentioned scientific publication and co-pending application, and therefore need be reviewed only in pertinent relation to the present invention. In mirror storage, as illustrated, the entry pulses, applied to the nuclei as previously explained, precede the recollection pulse in their chosen order, while the echoes follow the recollection pulse in reverse order. Thus it will be seen that the echo and storage pulses have "mirror" symmetry with respect to the center of the recollection pulse, hence the characteristic name for this type of echo procedure.

In the case of the stimulated echo process, as shown in the diagram, an R. F. "pre-pulse" $P_p$ is first applied to the sample. This pre-pulse is of sufficient amplitude and duration to tip all the nuclear moments of the sample substantially through 90 degrees, i. e., into the XY plane, where during a time interval $\tau_1$ they are permitted to spread and distribute themselves throughout the plane by differential Larmor precession as previously explained. Following the time interval $\tau_1$ the storage pulses are applied, these pulses having the effect of depositing groups or "families" of moment vectors on a system of cones revolving about the Z-axis or direction of the field $H_0$, i. e., the pulses may be described as entered into "Z-axis storage."

The recollection pulse $P_0$ is of proper duration and amplitude to tip the revolving moment cones again into the XY plane, at the same time having the effect of reversing the relative angular motions among the constituents of each moment group. Thereupon the constituents of the respective groups re-assemble to induce echo pulses in the coil 32, these pulses starting at the end of a second time period $\tau_1$ after the recollection pulse and appearing in the same order as their corresponding entry pulses. Thus the figure for the stimulated echo process will be seen to have "translational" symmetry in the relation of the entry pulses to the pre-pulse and the echoes to the recollection pulse.

If the condition of the magnetic field $H_0$ were to remain constant throughout, it will be evident that the above described "mirror" and "translational" symmetries necessary for echo production would be symmetries purely in time. However, if the inhomogeneity of $H_0$ changes, the change introduces a second factor of field condition which must be considered together with the time factor and in integrated relation thereto. In the present illustration, changes in field inhomogeneity are produced by supplying direct current pulses to the coils 33 and 34. The nature of these changes, and the manner in which they accomplish their double purpose in the present invention, will be set forth hereafter following a brief résumé of certain spin-echo phenomena which render the present method advantageous.

In order to set forth most clearly the distinctive formation of mirror type and stimulated echoes, these phenomena necessarily have been described separately in their idealized or pure state, that is, as though each type of echo process were carried out without any presence of the other, and as though each information pulse and its echo were an externally unaffected combination. However, since as previously pointed out, the actual physical phenomena involve the inter-relationships among countless spinning nuclei, the effects described comprise what may be termed the dominant resultant manifestations, but are by no means the only effects present. Thus, while storing information pulses primarily for mirror echo production, secondary or partial Z-axis storage also occurs, and similarly, storage primarily for stimulated echo production may be accomplished by secondary partial mirror-echo effects. It will be obvious that such unwanted echo effects, if not eliminated, must exercise a deteriorating influence on the production of the predominant or desired echoes.

In practice, with multiple information pulse entry and echo formation, a limitation on the practical number of pulses may be set by the production of spurious echoes due to inter-pulse effect which raise the "noise level" of the system and affect the amplitude of the desired echo pulses. These inter-pulse effects are largely a result of the action of each information pulse after the first upon the pulses which preceded it.

When information entries are supplied to the device as a train of pulses, each information pulse after the first tends to act also as a semi-recollection pulse and generate echoes. Similarly, each combination of three information pulses may tend to operate locally as pre-pulse, information pulse and recollection pulse, to set up spurious stimulated echo effects. If many such inter-pulse echoes occur simultaneously with some desired echo, the effective amplitude of the net voltage signal is greatly reduced from that which would result from the desired echo alone.

A second practical consideration, particularly when it is desired to store a large number of information pulses, lies in the magnitude of R. F. power requirement for the recollection pulse and, in the case of stimulated echoes, for the pre-pulse. For satisfactory reception of an R. F. information pulse, the chemical sample must provide a Larmor frequency range or band-width substantially greater than the frequency range of the pulse, in order to take up all the latter's frequencies. On the other hand, either a recollection pulse or a pre-pulse must provide a frequency band-width much greater than the Larmor band-width of the sample, in order to ensure picking up all the latter's frequencies in rotating the nuclear moments through the relatively large optimum angle. However, the span of frequencies provided by an applied R. F. pulse is inversely proportional to the duration of the pulse. It therefore follows that if the Larmor band-width of the sample remains substantially the same for information pulses, pre-pulse and recollection pulse, the relatively wide frequency range of the latter two pulses entails a relatively short time duration thereof, with attendant relatively high voltage across the R. F. coil 32 in order to provide the necessary power for rotating all the moments as noted. Reduction of this high R. F. power requirement is obviously desirable.

In co-pending application Serial No. 384,741, now Patent No. 2,700,147, Dr. G. L. Tucker has set forth the above limitation, developing it in mathematical detail respecting the recollection pulse in a mirror echo system, and has devised a general method of drastically cutting the R. F. power requirement. The essence of this method, which is appropriately termed the Tucker effect, consists in providing a wide band of Larmor frequencies in the sample during the information entering and echo periods but contracting the Larmor band-width to a small fraction during application of control pulses, such as the recollection pulse. By this means, in accordance with the above noted inverse ratio between duration and available band-width in an R. F. pulse, the smaller necessary band-width permits a longer period of application with accompanying reduction in power requirement.

In applying the above effect to a stimulated echo system, it is necessary to provide the reduced Larmor band-width not only during the recollection pulse but also during the pre-pulse, since each of these pulses must rotate all the nuclear moments through the requisite control angle, as previously noted. To obtain the maximum power reduction while maintaining optimum echo effect obviously calls for a minimum uniform field inhomogeneity during the control period and a high inhomogeneity condition throughout the entry and echo periods. However, a uniformly high level during the latter periods would be subject to the previously noted first limitation, namely the formation of inter-pulse echoes. To prevent such effect, a field variation may be introduced during the entry of information pulses which within that period denies the requisite local symmetries essential to formation of either mirror or stimulated type echoes, in the manner set forth in the previously mentioned application Serial No. 448,592. To assure satisfactory uniformity in formation of desired echoes, particularly when the latter are to be produced in large numbers, it is desirable that the field variation during entry (and its translationally matching variation during echo formation) be held to the minimum required to exercise the preventive function. Thus the present invention contemplates two differing requirements, i. e., a major change in amplitude of field inhomogeneity $\Delta H_0$ to produce the Tucker effect, and a minor variation in amplitude to eliminate spurious echoes. These two conditions may be met in a simple composite manner as follows:

The magnet 31 is so constructed and magnetized as to provide per se a minimum of field inhomogeneity throughout the sample 30. Thus, when the sample is exposed to the field of the magnet alone a very narrow band of Larmor frequencies is established therein, as illustrated at the left end of curve F, Figure 4. To provide the wide Larmor band-width desired during information entry and echo formation, a distortion of the field $H_0$ is produced by passing a direct current through the bucking magnet coils 33 and 34, thus correspondingly widening the inhomogeneity spectrum $\Delta H_0$. The composite $\Delta H_0$ spectrum resulting from action of the magnets 33 and 34 differs from that due to the magnet 33 alone not only in amplitude but also in local nature, i. e., the changes affecting the various individual regions of the sample 30 are not proportional but instead are mixed or mutually "scrambled" by any change in the magnet current. This "scrambling" effect of current change is utilized in the prevention of spurious echoes, as hereinafter set forth. To control the magnet current in such manner as to produce the above described composite effect, a gate 48 in the magnet circuit is provided with a controlling means illustrated typically as a network 49, Fig. 2.

Referring to the latter figure, it will be seen that the network 49 contains four triodes $V_1$, $V_2$, $V_3$ and $V_4$. The grid of $V_1$ is connected at point 1 to a tripping conductor 50 leading from the synchronizer 35. The tubes $V_2$ and $V_3$, together with their related components as shown, comprise a multi-vibrator combination adapted to actuate the output tube $V_4$ via a coupling condenser $C_2$. The cathode-connected output of the $V_4$, point 3, drives the gate 48, which is of a type (such as a pentode) adapted to produce a current output proportional to its input voltage.

In operation, the synchronizer or main pulse generator 35 operates via the previously described R. F. circuit, Fig. 2, to impress on the sample 30 the pre-pulse $P_p$, a train of information pulses $P_i$, and the recollection pulses $P_r$, as shown by curve A, Fig. 4. At the end of a short interval $T_0$ after the pre-pulse, the synchronizer impresses a positive pulse 51 on the grid of the tube $V_1$, as illustrated in curve B. A second identical pulse 52 is impressed at the end of a second equal time interval $T_0$ following the recollection pulse. As the effects of the pulses on the network 49 are identical, that of the first pulse 51 will be described as typical.

$V_1$ is a puller tube, which isolates the multi-vibrator ($V_2$, $V_3$) from the synchronizer. Application of the positive pulse or spike 51 to the grid of $V_1$ couples a negative spike to the grid of $V_3$, whereupon the circuit operates regeneratively as a normal cathode-coupled single shot multi-vibrator, generating a rectangular output wave 53 as shown in curve C, Fig. 4. The length of the wave 53 is determined by the value of $R_1, C_1$ (Fig. 2), the $B+$ voltage, and the voltage at the grid of $V_2$. Thus by adjustment of variables $R_1$ and $C_1$, the wave 53 may be made of proper length to accommodate any desired length of information pulse train within the maximum time capacity of the particular sample 30. At the same time, if $R_2$, $C_2$, Fig. 2, be correlated approximately with the length of the output pulses from $V_3$, a distinct droop will occur in the pulses at the grid of V and hence in the output at point 3. (Assuming zero grid current in $V_4$, the voltage at the grid falls by a factor of $$\frac{1}{e}$$

in time $R_2, C_2$.) It will be evident, therefore, that by adjustment of variables $R_2$ and $C_2$, any desired degree of droop may be provided in the output voltage waveform 54, Fig. 4, D.

The wave 54 is translated proportionally by the gate 48 into current through the magnet coils 33 and 34, producing a corresponding wave 55 of magnetic field variation $\Delta H_0$, Fig. 4, E, and hence a corresponding form 56 of Larmor band-width 57, Fig. 4, F, affecting the sample 30. A diode 58, shunted around the resistor $R_2$ in the grid circuit of $V_4$, Fig. 2, provides for D. C. restoration, clipping off any negative going trailing edge at the grid of $V_4$ and thus rendering the termination of the waves 54, 55 and 56 as sharp as possible. This effect is of importance, for while due to the fact that information pulses in Z-axis storage are insensitive to field changes, the shape of the wave during time $T_f$ between the termination of storage and the recollection pulse $P_r$ has no significant bearing on the stored pulses per se, it is advantageous for best results that no trailing edge of inhomogeneity change be permitted to intrude on the recollection pulse itself. Thus by sharply terminating the major wave 56, the time $T_f$ may be made small to allow maximum storage time while a clean and uniform minimum $\Delta H_0$ is assured throughout $P_r$ for most advantageously utilizing the previously described Tucker effect. Since no current existed in the coils 33 and 34 prior to the tripping pulse 51, the same reduced power requirement applied during the pre-pulse $P_p$.

The second trigger pulse 52, actuating the network 49 as described, results in a second wave 55 in $\Delta H_0$ starting at the time interval $T_0$ after the recollection pulse $P_r$. Since the first and second waves are identical in shape and time relation in equal respective time zones $T_i$ and $T_e$, they fulfill throughout the prime condition requisite for the production of stimulated echoes. This condition for the production of a stimulated echo $e_n$ from any previous information pulse $P_{in}$ may be expressed by the equation $$\int_{t_1}^{t_2} \Delta H_0 dt = \int_{t_3}^{t_4} \Delta H_0 dt$$

where $t_1$ is the termination of the pre-pulse $P_p$, $t_2$ is the entry time of the information pulse $P_{in}$, $t_3$ is the termination of the recollection pulse $P_r$, and $t_4$ is the time of echo $e_n$, this latter time being normally defined by $t_4 - t_3 = t_2 - t_1$. Since, as noted, the repetitive waves 55 fulfill this condition of integral translational symmetry, the desired echo train corresponding to the entered train of information pulses $P_i$ appears as illustrated in Fig. 4, G. However, due to the continuous change in the major amplitude and consequent continuous change in "scrambling" of $\Delta H_0$ throughout the time while the information pulses are being entered, no translational integral symmetry in time and field condition can arise in local time periods involving groups of information pulses within the main train, so that spurious stimulated interpulse echoes cannot form. At the same time, the completely asymmetric shape of the waves 55 themselves prevents any possibility of integral mirror symmetry in time and field condition either within the information pulse train or between it and the echo train. This inhibits the formation of any spurious mirror echoes, since such mirror symmetry is requisite for mirror echo production.

From the foregoing description, it will be evident that the present invention fulfills its dual object in a simple and readily regulated manner, providing a uniform minimum field inhomogeneity throughout the control (pre-pulse and recollection pulse) periods, a greatly increased inhomogeneity during the entry and echo periods, and a minor change in the major amplitude of inhomogeneity throughout the latter two periods. The resulting narrow Larmor frequency spectrum in the sample 30 during the control periods allows the use of pre-pulses and recollection pulses of relatively low power instead of the otherwise high-powered pulses typified in dot and dash lines, Fig. 4, A, the difference being in actuality much greater than the limitations of illustration permit to be depicted. Similarly, the necessities of illustration have caused the degree of droop in the major amplitude of waves 54, 55 and 56 to be somewhat exaggerated and occurring in a straight line in the drawings. In practice the degree of variation effective to inhibit the formation of spurious echoes may be made quite small and may assume any reasonable contour so long as translational integral symmetry is maintained respecting the time period $T_i$ and $T_e$. Adjustment of the degree of minor change to the effective minimum results in maximum uniformity in echo production, while the adjustability in length and the sharp termination of the waves of field variation permit most advantageous utilization of the storage time, as previously noted.

The present invention is highly advantageous in the repetitive type of process for extended indication, analysis, etc., due to its simplicity and ease of adaptation and the uniform stability in regular repetitive operation of electronic means as illustrated, readily providing the requisite symmetries and related conditions with precision and reliability. The combination shown in Fig. 2 provides preferred means of accomplishing the described composite result, but it will be understood that this combination is presented as typical, since various equivalent structures and procedures may be employed to carry out the method. In other words, while the invention has been set forth in preferred form it is not limited to the precise details illustrated, as various modifications may be made without departing from the scope of the appended claims.

We claim:

1. A stimulated spin echo process of information storage and recovery by controlled differential Larmor precession of gyroscopic particles in a polarizing field, said process having successively a first control period, a storage period, a second control period, and an echo period, which process includes the steps of providing a predetermined inhomogeneity of low amplitude in said field throughout said first control period, augmenting said field inhomogeneity in said storage period in a wave having a major amplitude throughout the time of said storage, establishing a minor modulating variation in said major amplitude throughout the duration thereof whereby spurious echo formation may be inhibited, restoring said predetermined low inhomogeneity amplitude, maintaining said low amplitude throughout said second control period, and duplicating said modulated augmenting wave in said echo period.

2. A process according to claim 1 including the step of restricting the degree of said minor variation to a minimum requisite for said inhibition of said spurious echo formation, whereby maximum uniformity may be maintained in said information storage and recovery.

3. A process according to claim 1 wherein said minor variation comprises a decreasing gradient in said major wave amplitude throughout the time of said storage.

4. A process according to claim 1 wherein said restoring step includes sharply terminating said augmenting wave at the termination of said minor modulating variation.

5. A process according to claim 1 wherein said restoring step includes sharply terminating said modulated augmenting wave at a time closely preceding said second control period whereby said storage period may be of maximum effective extent in said process.

6. Apparatus for storing information in and subsequently extracting said information from a sample of chemical substance by nuclear induction comprising, in combination, timing means for establishing an operational succession including four time periods, means to apply a polarizing field throughout said sample to polarize gyromagnetic particles thereof, said field having a narrow fixed spectrum of strength inhomogeneity during said control periods, means controllable by said timing means to apply a torsional radio-frequency conditioning pre-pulse to said gyromagnetic particles in said first time period, to apply a train of torsional radio-frequency information pulses to said particles during said second time period, and to apply a torsional radio-frequency recollection pulse to said particles in said third time period, whereby said particles may form a train of stimulated spin echo pulses correspondent to said information pulses by differential precession to constructive magnetic interference in said fourth time period, means controllable by said timing means to augment said field strength inhomogeneity in duplicate waves of major amplitude extending respectively throughout the durations of said information pulse train and said echo pulse train, means to establish a minor variation gradient in said major inhomogeneity amplitude of each of said duplicate waves, and means to detect said echo pulses.

7. Apparatus according to claim 6 wherein said augmenting means includes adjustable means to pre-determine the duration of said waves.

8. Apparatus according to claim 6 wherein said gradient-establishing means includes means to adjust the degree of said minor amplitude variation relative to said major amplitude of field inhomogeneity.

9. Apparatus according to claim 6 wherein said augmenting means includes adjusting means to determine the duration of said waves, and including means for sharply terminating said waves, whereby the duration of said information pulse train may be carried to a point in time closely preceding said recollection pulse.

References Cited in the file of this patent

UNITED STATES PATENTS 2,714,714  Anderson _____ Aug. 2, 1955